Nov. 20, 1962   R. J. BOEDIGHEIMER ETAL   3,064,777
ONE-WAY CLUTCH
Filed Sept. 6, 1960

Inventors:
Raymond J. Boedigheimer
and Stephen J. Zanoni
By: Frank R. Thuepont  Atty.

United States Patent Office 3,064,777
Patented Nov. 20, 1962

3,064,777
ONE-WAY CLUTCH
Raymond J. Boedigheimer, Chicago, and Stephen J. Zanoni, Glen Ellyn, Ill., assignors to Borg-Warner Corporation, Chicago, Ill., a corporation of Illinois
Filed Sept. 6, 1960, Ser. No. 54,068
4 Claims. (Cl. 192—45)

The present invention relates to one-way clutches and particularly to a one-way clutch of the type using roller elements. A device of the same general character is disclosed in copending Borg-Warner Corporation patent application case Serial No. 41,572, filed on July 8, 1960.

An object of this invention is to provide a biasing means which is effective to prevent back lash as the clutch device moves from an overrunning condition to a lock up condition and at the same time is effective to urge the roller elements into wedging relationship between the driving and driven members.

Another object of the present invention is to provide an extremely simple device which will effectively perform the one-way engaging function.

A further object is to provide a device having a minimum number of parts and which may be easily and economically manufactured in a wide range of sizes from miniature sizes to the largest required.

The foregoing and other objects and advantages of the present invention will become apparent from the following detailed description thereof when read in conjunction with the accompanying drawings wherein.

Figure 1:
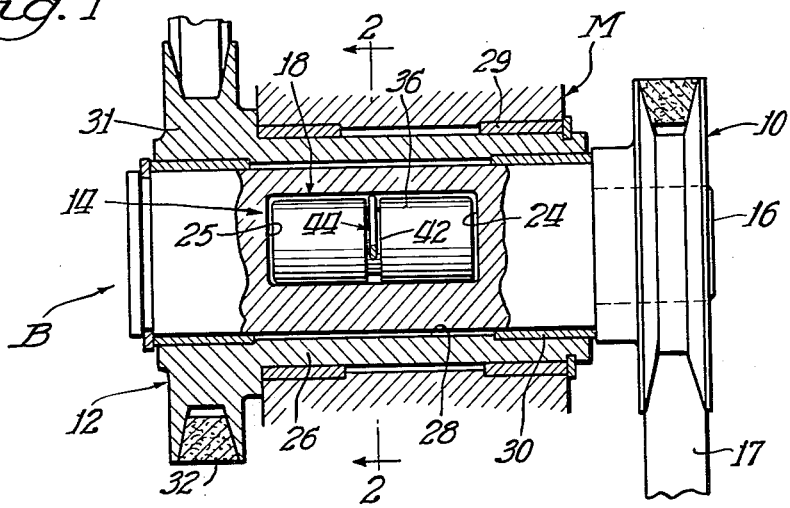
FIG. 1 is an axial sectional view of an example of a driving and driven assembly incorporating one preferred form of the present one-way engaging device, this view being taken partially on line 1—1 of FIG. 2.
Figure 2:
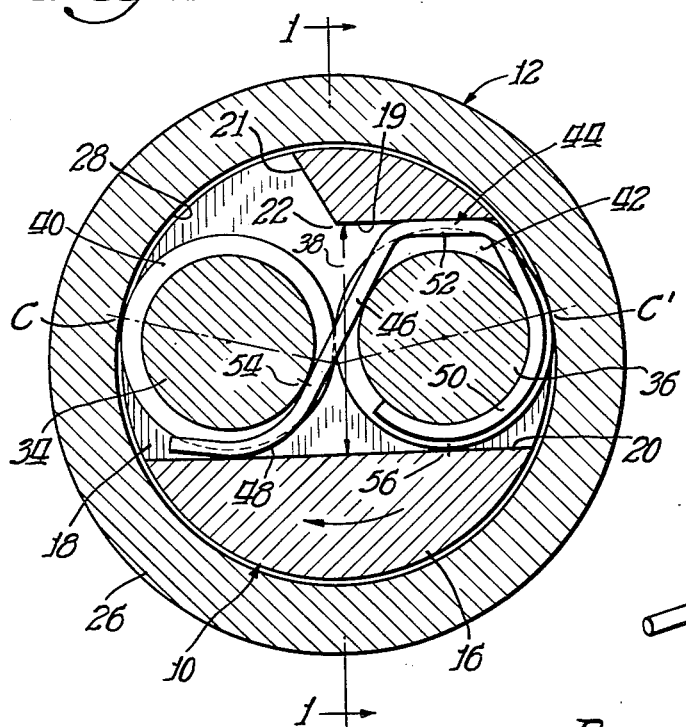
FIG. 2 is an enlarged end sectional view taken at line 2—2 of FIG. 1 showing a slotted shaft, roller clutch elements and a substantially S-shaped energizing and anti-back lash biasing means.
Figure 3:
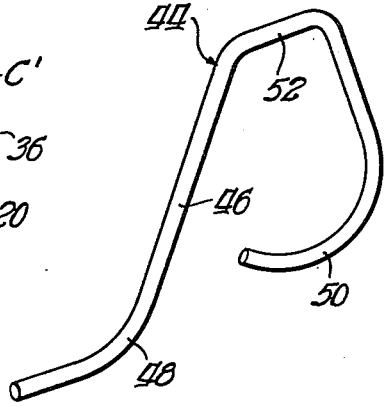
FIG. 3 is a detail perspective view of the biasing means shown in FIG. 2.

Referring now to the drawing wherein like numerals in the different views identify identical parts, the device B comprises a driving member 10, a driven member 12 and clutching means 14 for operatively connecting the driving and driven members. The driving member 10 comprises a drive shaft 16 which may be constantly driven by any means such as, for example, by a pulley and belt arrangement 17 as shown in FIG. 1. The drive shaft 16 has formed therein a longitudinally extending transverse slot 18 defined by surfaces 19 and 20. As seen in FIG. 2 it will be noted that the shaft 16 has a portion thereof cut away so as to form a surface 21. This surface 21 extends the length of the slot 18 and intersects with the surface 19 at a longitudinally extending line shown as point 22. Surfaces 24 and 25 define the ends of the slot 18. While the slot 18 may be centrally positioned in the shaft, in a preferred embodiment of this device as shown in FIG. 1, the slot 18 is positioned slightly off center.

The driven member 12 comprises a generally cylindrical longitudinally extending member 26 having formed thereon an internal cylindrical surface 28 which may be referred to as an outer race.

The member 12 may be adapted to be rotatably mounted with a stationary structure M on bearings 29. The drive shaft 16 may then be rotatably mounted within the member 12 by means of bearings such, for example, as bronze bearings 30 secured to the member 26. In the embodiment as shown a running bearing clearance is provided between the shaft 16 and the cylindrical surface 28 of the member 26. By way of example, an output means such as the output pulley 31 may be formed on or connected to the member 26 by any suitable means. The output from pulley 31 may be transmitted to other means to be driven (not shown) by a belt 32. The belt and pulley arrangement is merely illustrative of the type of output means that may be connected to the member 26. Other means such as gearing, for example, could just as easily be used.

It will be appreciated from the foregoing and from the more detailed description of the operation as hereinafter described that the driven member 12 may also serve as a driving member if the driving member 10 is used as a driven member. For purposes of explanation throughout the specification, however, the driving member will be considered as 10 and the driven member as 12.

The clutching means used in this invention for operatively connecting the driving and driven members comprises a pair of roller elements 34 and 36. In the preferred form of this invention the roller elements 34 and 36 are of substantially the same diameter. The sum of the diameters of the roller elements 34 and 36 is slightly less than the inner diameter of member 26, that is, the diameter of the cylinder defined by the surface 28.

It will be noted that the diameter of roller element 36 is slightly less than the width of the slot 18 indicated by the distance marked 38. On each of the rollers 34 and 36, grooves 40 and 42 are formed. These grooves are adapted to receive a biasing means in the form of spring 44. The spring 44 is of a generally S-shaped configuration having a central portion 46, a bottom semi-loop portion 48 in contact with the roller 34 and a top loop portion 50 substantially encircling the roller 36. The loop portion 50 may be formed with a flat portion 52 which may fit against the surface 19 of the slot 18. Where the roller elements are of substantial length, it will be appreciated that a plurality of springs may be used mounted in separate grooves in the roller with two springs generally sufficing.

The spring 44 serves both as an energizing spring and as an anti-back lash spring. It is this spring which is the improved feature of the device disclosed in copending application Serial No. 41,572 filed on July 8, 1960. As a single spring it eliminates the necessity for two springs to accomplish the energizing function and the anti-back lash function. Furthermore, it is conveniently fitted around the rollers without any serious danger of being displaced away from the rollers.

In operation, when the driving member 10 is rotated in a clockwise direction relative to the driven member 12 as indicated by the arrow in FIG. 2, the roller elements 34 and 36 will tend to remain in a loose position in the slot 18 but maintain a slight frictional rolling contact with the cylindrical surface 28 and with each other. Roller element 36 will also maintain a slight frictional contact with the surface 20. The roller elements 34 and 36 will also tend to maintain a slight frictional contact with the cylindrical surface 28 due to the centrifugal force which will tend to throw them outwardly, but frictional contact with the cylindrical surface 28 will tend to move the roller 34 to the left as viewed in FIG. 2, and toward the surface 20 of the slot 18. In other words, the rollers 36 and 34 will tend to occupy a non-wedging position by moving toward a diametral position with respect to the member 26. Since the sum of the diameters of the roller elements 34 and 36 as previously stated is less than the inner diameter of the member 26, the rollers 34 and 36 will exert only a very light drag and will not exert a wedging effect between the driving and driven members. In this condition, the drive shaft 16 is in an overrunning condition with respect to the member 26.

If on the other hand, an attempt is made to rotate the driving member 10 in a counterclockwise direction (as seen in FIG. 2) with respect to the member 26, the driving and driven members will be locked and will rotate as a unit. Under these conditions, it will be noted that the frictional contact of the cylindrical surface 28 with the roller element 34 together with the effect of the spring 44 will tend to move the rollers tightly into contact with each other and into a wedging engagement with the cylindrical surface 28. The spring 44 has been so pre-stressed that in its assembled position encircling the rollers and through its contact with the roller 34 and point 54, the roller 34 is urged upwardly into wedging contact with the surface 28 and the roller 36. At the same time, again due to the pre-stressed condition of the spring, the roller 36 is urged downwardly as viewed in FIG. 2, into contact with the surface 20 at point 56, thus preventing a back lash of the roller 36 when the device assumes a locked up condition.

It will be observed from FIG. 2 that when the roller elements are wedged so as to effect an operable connection between the driving and driven members, they are respectively in contact with each other and with the race surface 28 at points C and C'. It will be observed that these points are substantially more than 90 degrees apart but cannot be exactly 180 degrees apart because under the latter condition there would be no wedging action.

The roller and slot sizes are so proportioned that the points of contact of the rollers with the race surface defines an arc of less than 180 degrees which is preferably between 150 degrees and 170 degrees.

As previously noted, a portion of the shaft 16 extending for the length of the slot 18 has been cut away so as to form a surface 21 which intersects with the surface 19 at a longitudinally extending line 22. As can easily be seen in FIG. 2, this cut away portion provides a clearance for the roller 34 when the roller 34 is snapped into wedging engagement with the member 26 and the other roller element 36. It will be noted that if the surface 19 were extended there would be a possible interference between the extended portion of the surface 19 and the roller 34. As previously mentioned, the pre-stressing of the spring 44 is effective to keep the roller 36 in contact with the surface 20 at point 56 even during overrunning so that no back lash will occur as the rollers move from an unlocked position into a locked position, that is, wedging engagement.

It will thus be seen that the invention herein described presents an efficient, simple, easily constructed one-way engaging device having a minimum number of parts devoid of a number of precision machining operations. Furthermore, the spring means herein disclosed advantageously provides a single means for accomplishing both an energization of the rollers and preventing back lash when the rollers are snapped into wedging engagement.

While a certain preferred embodiment of the invention has been specifically disclosed, it is understood that the invention is not limited thereto as certain variations will be readily apparent to those skilled in the art and the invention is to be given its broadest possible interpretation within the terms of the following claims.

We claim:

1. A one-way engaging device comprising two concentrically disposed members relatively rotatable in one direction, the first member having formed thereon a race surface, the second member having formed therein a transversely extending slot extending entirely through said member, clutching means comprising a pair of roller elements disposed in said slot to prevent relative rotation of said two members in one direction but effective to permit relative rotation between said two members in the opposite direction, biasing means for urging said roller elements into contact with each other and with said race surface to assist in effecting an operable connection between said two members, and biasing means for preventing back lash in the roller elements when the device is moved into a locked condition, said last two named means comprising a single spring means connected to said roller elements.

2. The device of claim 1 wherein said single spring means is a substantially S-shaped spring.

3. The device of claim 1 wherein said single spring means is a substantially S-shaped spring, the straight portion of the S-spring extending between said rollers and the loops of said S-spring being respectively in peripheral contact with said rollers.

4. The device of claim 3 wherein said S-spring is mounted in grooves in each of said rollers.

References Cited in the file of this patent

UNITED STATES PATENTS

| | | |
|---|---|---|
| 2,001,668 | Maier | May 14, 1935 |
| 2,189,930 | Shurmann | Feb. 13, 1940 |
| 2,371,442 | Hammond | Mar. 13, 1945 |

FOREIGN PATENTS

| | | |
|---|---|---|
| 25,412 | Norway | Jan. 18, 1915 |
| 278,427 | Great Britain | Oct. 5, 1927 |